United States Patent [19]

Ohmae

[11] Patent Number: 5,414,866
[45] Date of Patent: May 9, 1995

[54] ONE-CHIP MICROCOMPUTER WITH PARALLEL OPERATING LOAD AND UNLOAD DATA BUSES

[75] Inventor: Hideo Ohmae, Kobe, Japan
[73] Assignee: Rohm Co., Ltd., Kyoto, Japan
[21] Appl. No.: 783,906
[22] Filed: Oct. 29, 1991
[51] Int. Cl.⁶ .............................................. G06F 13/40
[52] U.S. Cl. ................................. 395/800; 364/925.6; 364/936; 364/232.8; 364/239
[58] Field of Search .................. 395/425, 550, 800

[56] References Cited

U.S. PATENT DOCUMENTS

| | | | |
|---|---|---|---|
| 4,050,058 | 9/1977 | Garlic | 364/DIG. 1 |
| 4,085,448 | 4/1978 | Kogge | 364/DIG. 2 |
| 4,112,490 | 9/1978 | Pohlman | 364/DIG. 1 |
| 4,378,589 | 3/1983 | Finnegan | 395/325 |
| 4,450,519 | 5/1984 | Guttag | 364/DIG. 2 |
| 4,626,985 | 12/1986 | Briggs | 364/DIG. 1 |
| 4,803,617 | 2/1989 | Berarducci | 395/800 |
| 4,811,279 | 3/1989 | Bean | 395/325 |
| 4,914,580 | 4/1990 | Jensen | 395/325 |
| 4,964,046 | 10/1990 | Mehrgardt | 395/250 |

Primary Examiner—David Y. Eng
Attorney, Agent, or Firm—Fay, Sharpe, Beall, Fagan, Minnich & McKee

[57] ABSTRACT

A one-chip microcomputer is equipped with a two-data-bus system, a first and a second data bus, so that data is transferred from an internal register to one bus and different data from RAM or an I/O buffer to the other. The internal register and RAM or the I/O buffer are induced to transfer different data simultaneously to different buses in the same machine cycle at the same timing, respectively. As data exist on different buses, the data on the respective buses can be loaded simultaneously by the internal register and RAM or the I/O buffer at the same timing. As a result, transfer of data to the buses from the internal register and RAM or the I/O buffer can be implemented simultaneously at a given timing within one machine cycle. At the same time, data can be loaded simultaneously from the buses to the internal register and RAM or the I/O buffer at a given different timing.

13 Claims, 2 Drawing Sheets

ONE-CHIP MICROCOMPUTER WITH PARALLEL OPERATING LOAD AND UNLOAD DATA BUSES

BACKGROUND OF THE INVENTION

1. Technical Field

The present invention relates generally to one-chip microcomputers and more particularly to a one-chip microcomputer with improved processing speed when a data exchange is made between a group of internal registers and RAM, an I/O buffer or the like.

2. Background Art

One-chip microcomputers are widely used as control circuits in cameras, home electric appliances, and other kinds of electronic equipment, these being generally 4- or 8-bit one-chip microcomputers. A one-chip microcomputer of this sort is slightly different in internal construction from a general purpose microprocessor in that RAM and the like, each having a fixed capacity, are contained in one chip and connected to an internal bus. An exchange of signals with an external device is made via an I/O buffer connected to the internal bus. Such a one-chip microcomputer is designed to exchange data with an external circuit via the I/O buffer under the control of a central processor (or a controller, these are hereinafter collectively called 'CPU') over these circuits.

The one-chip microcomputer incorporates various kinds of commands different from those associated with the general purpose microprocessor to exercise control efficiently. Among these commands, there is one (a data exchange command) for instructing the group of registers within CPU and CPU to exchange data via the internal bus with RAM and the I/O buffer as external circuits.

Data exchange processing methods during the execution of a data exchange command from the conventional one-chip microcomputer are as follows:

A first method, as shown in FIG. 3(a), is to transfer two kinds of data 11 (e.g., the data held in the internal register) and 12 (e.g., the data held in RAM or the I/O buffer) in one machine cycle successively to a data bus on a time-sharing basis. A second method is, as shown in FIG. 3(b), to transfer data 11, 12 from one side to the other in respective machine cycles. As two machine cycles are employed in this later method, the timing of transferring data from CPU (internal register) to RAM or the I/O buffer and that of transferring data to CPU may be allotted to different machine cycles. As a result, it becomes possible to divide the data transfer direction in accordance with the machine cycles. In this case, however, two machine cycle periods will be required for such data exchange as shown in FIG. 3(b). Incidentally, the last period 13 in each machine cycle is a precharged second with respect to the bus.

The first method for data exchange processing makes it possible to implement the data exchange processing in one machine cycle. However, data transfer timing on a bus has to be controlled on a time-sharing basis as sequential data transfer from one to another, that is, between RAM or the I/O buffer and the internal register as objects for data exchange, is needed in response to a limited number of clock pulses within one machine cycle. The disadvantage is that control of data transfer becomes complicated. The second method is also disadvantageous as instruction execution takes time as two machine cycles are required. Moreover, a number of data exchange commands are used in such a one-chip microcomputer and this tends to lower the total processing speed.

SUMMARY OF THE INVENTION

A one-chip microcomputer according to the present invention features a two-bus system, a first and a second data bus, so that data is transferred from an internal register to one bus and different data is transferred from RAM or an I/O buffer to the other bus. The internal register and RAM or the I/O buffer are induced to transfer different data simultaneously to different buses in the same machine cycle at the same timing, respectively. As data exist on different buses, the data on the respective buses can be loaded simultaneously by the internal register and RAM or the I/O buffer at the same timing.

A specific arrangement therefor comprises a CPU connected to a bus (the CPU including an internal data bus and an internal register), a RAM connected to the bus, an I/O buffer connected to the bus, the data bus being divided into a first data bus for transferring data to the internal register and a second data bus for receiving data from the internal register. During the data exchange processing, the CPU controls transfer of data in the internal register to the second bus and transfer of data in either the RAM or the I/O buffer to the first bus in accordance with first clock timing in one machine cycle. The CPU also controls the loading of the data on the first bus to the internal register and the loading of data on the second bus to either the RAM or the I/O buffer in accordance with later second clock timing of the one machine cycle.

As a result, transfer from data to the buses of the internal register and RAM or the I/O buffer can be implemented simultaneously at a given timing within one machine cycle. At the same time, data can be loaded simultaneously from the buses to the internal register and RAM or the I/O buffer at a given different timing of the some machine cycle. Therefore, the data exchange processing within the one machine cycle is made possible and this improves the processing speed of the CPU. In this case, the hardware may be simplified since data are loaded on the buses at the same timing within one machine cycle. Even though there is provided a two-data-bus system, increase in hardware resulting from the addition of a data bus may be offset by the simplification of control system wiring and circuits. The layout of the remaining circuitry and the like are thus left almost nearly unaffected.

An object of the present invention is therefore to provide a one-chip microcomputer capable of making different data exchangeable between an internal register of CPU and RAM or a peripheral circuit such as an I/O buffer in one machine cycle.

Another object of the present invention is to provide a one-chip microcomputer wherein control system wiring and circuits can be simplified.

DESCRIPTION OF THE PREFERRED EMBODIMENT

Figure 1:
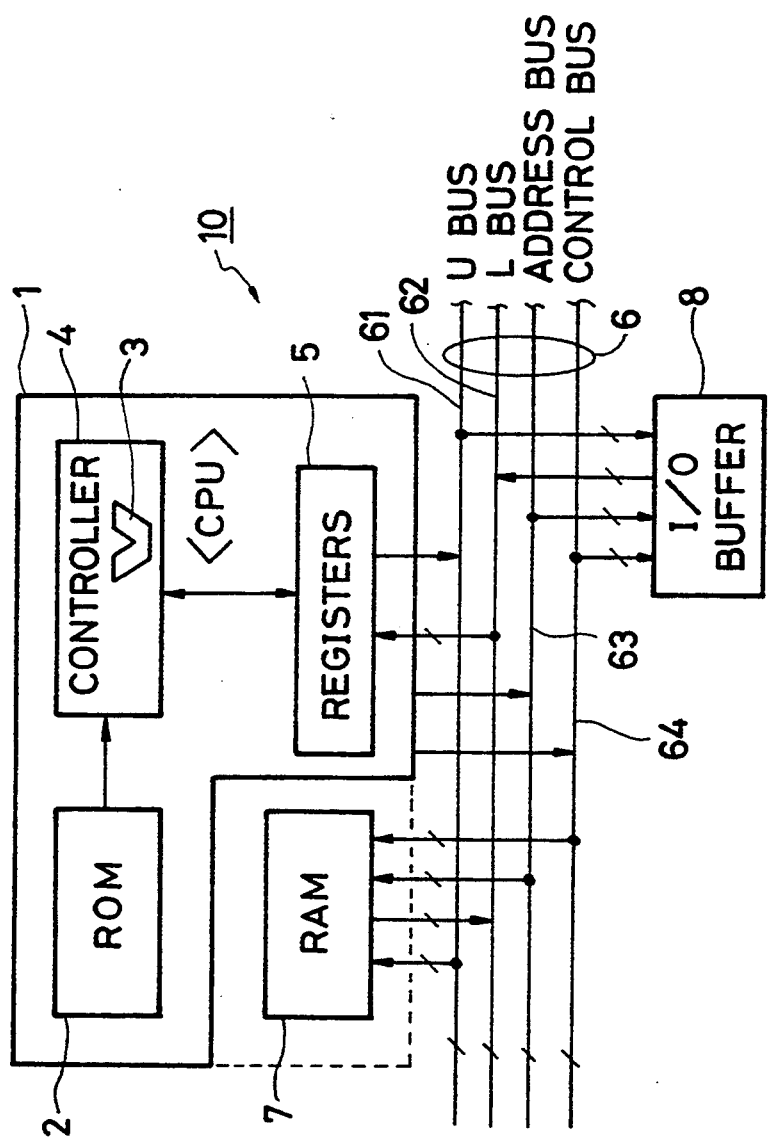
FIG. 1 is a block diagram of a one-chip microcomputer as an application of the present invention.

FIG. 1 illustrates a one-chip microcomputer 10 in which CPU 1 is connected via an internal bus 6 to RAM 7 and an I/O buffer 8.

CPU 1 comprises ROM 2 (which may be arranged as an external circuit of CPU 1) storing such as a microprogram, a controller 4 having a decoder, an arithmetic unit (ALU) 3 and the like for performing control operations on receiving data from ROM 2, and a group of registers 5. The group of registers 5 are connected to the internal bus 6 and CPU 1 exchanges data with RAM 7 and the I/O buffer 8 via some of the registers. The group of registers 5 include a register used for loading the results of ALU 3 and various other registers.

The internal bus 6 includes a U bus 61 and an L bus 62 constituting a data bus, an address bus 63 and a control bus 64. The U bus 61 has 8 bus lines if it is intended for 8-bit control or 4 bus lines if it is for 4-bit control. The U bus 61 is a so-called unload bus specifically provided for transferring data from CPU 1 to an external device and it is a special bus for receiving data from one of the registers 5 when viewed from RAM 7 and the I/O buffer 8.

The L bus 62 also has 8 bus lines if it is intended for 8-bit control or 4 bus lines if it is for 4-bit control. The L bus 62 is a so-called load bus specifically provided for transferring (loading) data from an external device to CPU 1, and it is a special bus for receiving data from RAM 7 and the I/O buffer 8 when viewed from the group of registers 5.

The data bus constituted by the U and L buses 61, 62 has twice as many wires as an ordinary data bus of the same number of bit control. By utilizing the two-data-bus system, CPU 1 is capable of exchanging data with RAM 7 and the I/O buffer 8 in one machine cycle.

Figure 2:
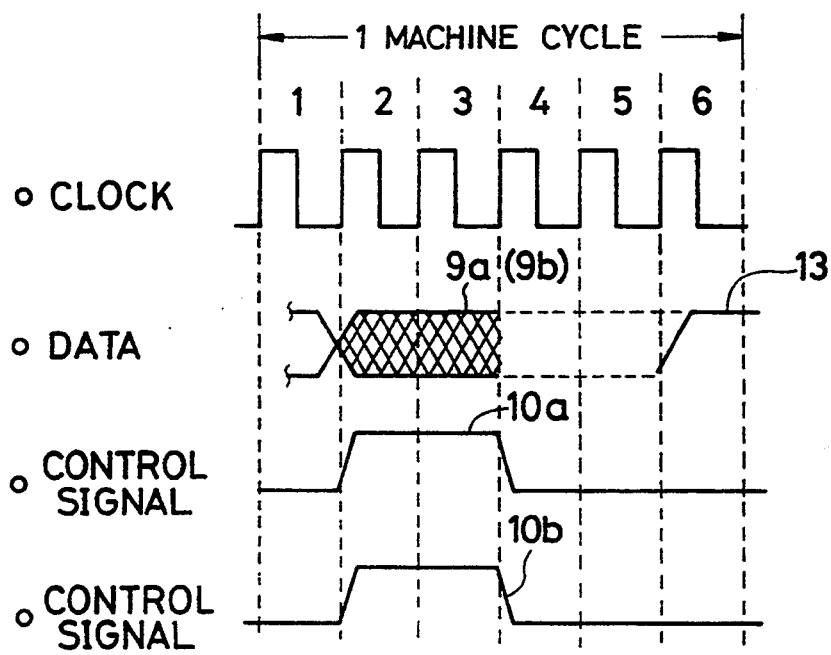
FIG. 2 is a timing chart of data exchange command processing.
Figure 3:
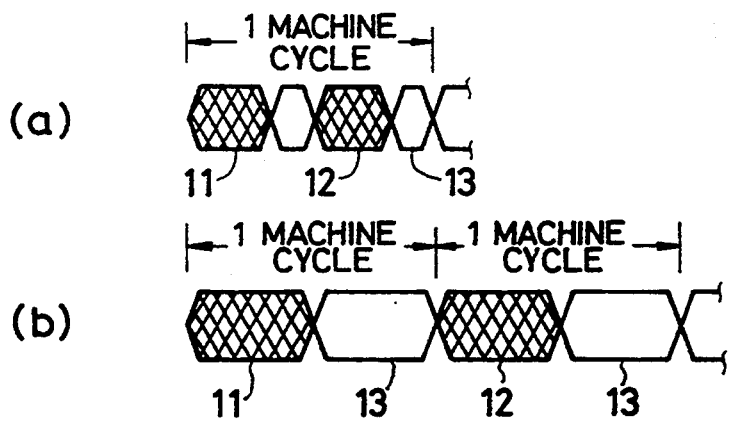
FIG. 3 is a timing chart of conventional data exchange command processing.

Referring now to FIG. 2, the operation will be described. In this case, a description will be given of one machine cycle assumed to be composed of 6 clock pulses. Moreover, selection of either RAM 7 or I/O buffer 8 as an object of data exchange is made according to an address signal from CPU 1; however, as the selection thereof is to be made as in the conventional case, the description of such known art will be omitted.

First, the process of transferring data from CPU 1 to RAM 7 or the I/O 8 will be described. CPU 1 issues a control signal 10a on the control bus 64 at the leading edge of a second clock pulse in one machine cycle, sets the control signal 10a at a high level (hereinafter called "H") and transfers data 9a in designated one of the registers 5 to the U bus 61. CPU 1 holds the data on the U bus 61 over two clock pulses, drops the control signal 10a at the lead timing of a fourth clock pulse, and sets the control signal 10a at a low level (hereinafter called "L") for the remainder of the machine cycle. At this "L" timing, the data is written to RAM 7 or the I/O buffer 8. In other words, the control signal 10a at "L" causes a write signal to be issued directly or correspondingly so as to control the write operation on RAM 7 or the I/O buffer 8. Incidentally, the timing of setting the control signal 10a at "L" is also the timing of suspending the generation of the control signal.

Consequently, the data 9a on the U bus 61 is transferred to RAM 7 or the I/O buffer 8 for certain at the timing of the two clock pulses, the fourth and a fifth clock pulses. Then the data bus of the internal bus 6 is precharged at a sixth clock pulse (precharged period 13) and each data line of the internal bus 6 is loaded with charge.

The process of transferring data to CPU 1 from RAM 7 or the I/O buffer 8 will be described. This process is performed at the same timing as stated above. However, the L bus 62 instead of the U bus 61 is employed this time. Therefore, the data on these buses U, L are prevented from being superposed, though the timing is the same.

More specifically, as shown in FIG. 2, CPU 1 raises a control signal 10b on the control bus 64 at the leading edge of the second clock pulse in the same one machine cycle, sets the control signal 10b at "H" and transfers data 9b in RAM 7 or the I/O buffer 8 to the L bus 62. CPU 1 holds the data 9b on the L bus 62 over two clock pulses, drops the control signal 10b at the lead timing of the fourth clock pulse and sets the control signal 10b at "L". At this "L" timing for clock pulses 4, 5, the data 9b is written to a selected one of the registers 5. The timing of setting the control signal 10b at "L" is also the timing of suspending the formation of the control signal 10b.

As in the preceding case, consequently, the data on the L bus 62 is transferred to the designated one of the registers 5 for certain at the timing of two clock pulses, the fourth and the fifth clock pulses. The data bus of internal bus 6 is then precharged at the sixth clock signal.

Even if load and unload controls are exercised at the same timing, that is, at the rise and fall timing of the control signals 10a, 10b, in the same machine cycle when there exits data exchange commands, no data confusion occurs. In other words, data confusion will not occur even though the control signals 10a, 10b are simultaneously produced as the data 9a and 9b are sent to different buses, the U and L buses 61, 62, respectively. Although RAM 7, the I/O buffer 8 and the selected one of the registers 5 are to receive data at the same timing designated as the fall timing of the control signals 10a, 10b, the data are prevented from being superposed since the register 5 and external devices 7, 8 are designed to receive the data 9a, 9b from the respective different buses 61, 62. As a result, the destination (RAM 7 or the I/O buffer 8) to which one of the registers 5 of CPU 1 transfers data and the source (RAM 7 or the I/O buffer 8) from which the one of the register 5 receives data may be the same one. This is because, on the part of these circuits, data is received from a data bus at the timing following the timing of the transfer of the data to the data bus.

As set forth above, the provision of the two-data-bus system renders it possible to exchange data bidirectionally between the group of registers of CPU 1 and RAM 7 or the I/O buffer 8 in the same machine cycle. Therefore, data exchange between the group of registers 5 of CPU 1 and either RAM 7 or the I/O buffer 8 may be completed in one machine cycle. Moreover, data exchange between RAM 7 and the I/O buffer 8 can be carried out via the internal register of CPU 1 for a period as short as two machine cycles.

Although the two-data-bus system has been employed in this embodiment, the data exchange control timing is made constant and synchronous. The control system wiring and the circuits are simplified. Therefore, an increase in hardware resulting from the addition of a bus line equivalent to one in a conventional system may be offset by the simplification of the control circuits. The layout of the remaining circuitry and the like are thus left almost nearly unaffected as compared to a conventional microcomputer.

Although one machine cycle contains 6 clock pulses in this embodiment, it may contain 4 clock pulses unless a period of two clock pulses is necessary for holding data. In addition, if one clock pulse for precharging purposes is unnecessary, one machine cycle may contain only 3 clock signals. Normally, 3 to 6 clock pulses constitute one period in one machine cycle of a one-chip microcomputer and therefore the present invention is applicable to such a one-chip microcomputer. In addition, the present invention may needless to say be applicable to a case where more clock pulses are to constitute one period in one machine cycle.

The CPU in this embodiment is connected to a bus via any one of the registers, which may be selected by the CPU or otherwise be a specific one. One register in place of the group of registers may needless to say be used according to the present invention.

Although one RAM 7 and one I/O buffer in combination are provided in this embodiment, each of them may be pluralized.

While a preferred embodiment has been set forth with specific details, further embodiments, modifications and variations are contemplated according to the broader aspects of the present invention, all as determined by the spirit and scope of the following claims.

I claim:

1. A one-chip microcomputer, comprising:
   buses including a data bus,
   a central processor unit, CPU, having a register connected to said data bus,
   RAM connected to said data bus,
   an I/O buffer connected to said data bus,
   said data bus having a first bus for transferring data to said register and a second bus for receiving data from said register,
   said processor constituting means that controls, during data exchange processing, parallel transfer of first data in said register to the second bus and transfer of second data in either said RAM or said I/O buffer to the first bus in accordance with first clock timing in one machine cycle,
   said means also controls parallel loading of the second data on the first bus to said register and loading of the first data on the second bus to either said RAM or said I/O buffer in accordance with later second clock timing of the one machine cycle,
   said processor produces, during the data exchange processing, a first control signal for controlling transferring the first data in said register to the second bus and a second control signal for controlling transferring the second data in either said RAM or said I/O buffer to the first bus in accordance with the first clock timing in the one machine cycle, and
   wherein said means controls suspension of the first and second control signals in accordance with the second clock timing in said one machine cycle, the loading of the second data on the first bus to said register in response to the suspension, and the loading of the first data on the second bus to either said RAM or said I/O buffer in response to the suspension.

2. A one-chip microcomputer as claimed in claim 1, wherein the one machine cycle consists of six clock pulses and wherein the first clock timing starts with the second clock pulse, whereas the second clock timing starts with the fourth clock pulse.

3. A one-chip microcomputer as claimed in claim 2, wherein the sixth clock pulse corresponds to a precharged period.

4. A one-chip microcomputer, comprising:
   a CPU including an internal controller having an ALU and decoder, a plurality of data handling registers, and an internal data bus connecting said controller and said registers;
   plurality of data handling devices external to said CPU;
   an address bus interconnecting said data handling devices and said CPU for transfer of address signals;
   a control bus interconnecting said data handling devices with said CPU for transfer of control signals;
   a data bus interconnecting said CPU and said data handling devices for transfer of data, and including a first data bus and a parallel second data bus;
   said CPU controlling said registers and said data handling devices for parallel transfer of first and second different data respectively on said first and second data buses with respect to said registers and said data handling devices;
   wherein said CPU controls unloading of data from said second data bus to a first register in parallel with unloading of data from said first data bus to a first data handling device; and
   wherein said CPU controls parallel loading of data on said first bus from one of said registers and loading of data on said second bus from one of said data handling devices.

5. A one-chip microcomputer as claimed in claim 4, wherein said CPU controls said loading and unloading to occur within a single machine cycle and so that said first register is the same as said one register and said first data handling device is the same as said one data handling device.

6. A one-chip microcomputer as claimed in claim 5, wherein said first data bus is a unidirectional unload bus and said second data bus is a unidirectional load bus having a bit capacity equal to a bit capacity of said unload bus.

7. A one-chip microcomputer as claimed in claim 6, wherein said CPU asserts and releases a first control signal, asserts and releases a second control signal at the same timing as the first control signal, controls loading of said first data bus with assertion of the first control signal, controls loading of said second data bus with the asserting of the second control signal, controls unloading of said first data bus with the releasing of the first control signal, and controls the unloading of said second data bus with the releasing of the second control signal.

8. A one-chip microcomputer as claimed in claim 5, wherein said CPU asserts and releases a first control signal, asserts and releases a second control signal at the same timing as the first control signal, controls loading of said first data bus with assertion of the first control signal, controls loading of said second data bus with the asserting of the second control signal, controls unloading of said first data bus with the releasing of the first control signal, and controls the unloading of said second data bus with the releasing of the second control signal.

9. A one-chip microcomputer as claimed in claim 4, wherein said first data bus is a unidirectional unload bus and said second data bus is a unidirectional load bus having a bit capacity equal to a bit capacity of said unload bus.

10. A one-chip microcomputer as claimed in claim 9, wherein said CPU asserts and releases a first control signal, asserts and releases a second control signal at the same timing as the first control signal, controls loading of said first data bus with assertion of the first control signal, controls loading of said second data bus with the asserting of the second control signal, controls unloading of said first data bus with the releasing of the first control signal, and controls the unloading of said second data bus with the releasing of the second control signal.

11. A one-chip microcomputer as claimed in claim 4, wherein said CPU asserts and releases a first control signal, asserts and releases a second control signal at the same timing as the first control signal, controls loading of said first data bus with assertion of the first control signal, controls loading of said second data bus with the asserting of the second control signal, controls unloading of said first data bus with the releasing of the first control signal, and controls the unloading of said second data bus with the releasing of the second control signal.

12. A one-chip microcomputer, comprising:
a CPU including an internal controller having an ALU and decoder, a plurality of data handling registers, and an internal data bus connecting said controller and said registers;
a plurality of data handling devices external to said CPU;
an address bus interconnecting said data handling devices and said CPU for transfer of address signals;
a control bus interconnecting said data handling devices with said CPU for transfer of control signals;
a data bus interconnecting said CPU and said data handling devices for transfer of data, and including a first data bus and a parallel second data bus;
said CPU controlling said registers and said data handling devices for parallel transfer of first and second different data respectively on said first and second data buses with respect to said registers and said data handling devices; and
wherein said CPU asserts and releases a first control signal, asserts and releases a second control signal at the same timing as the first control signal, controls loading of said first data bus with assertion of the first control signal, controls loading of said second data bus with the asserting of the second control signal, controls unloading of said first data bus with the releasing of the first control signal, and controls the unloading of said second data bus with the releasing of the second control signal.

13. A one-chip microcomputer as claimed in claim 12, wherein said first data bus is a unidirectional unload bus and said second data bus is a unidirectional load bus having a bit capacity equal to a bit capacity of said unload bus.

* * * * *